A. LOMSCHAKOW.
HEAT EXCHANGE DEVICE.
APPLICATION FILED DEC. 26, 1911.

1,048,186.

Patented Dec. 24, 1912.
3 SHEETS—SHEET 1.

Witnesses:

Inventor:
Alexei Lomschakow.
per
Lawrence Langner,
Attorney.

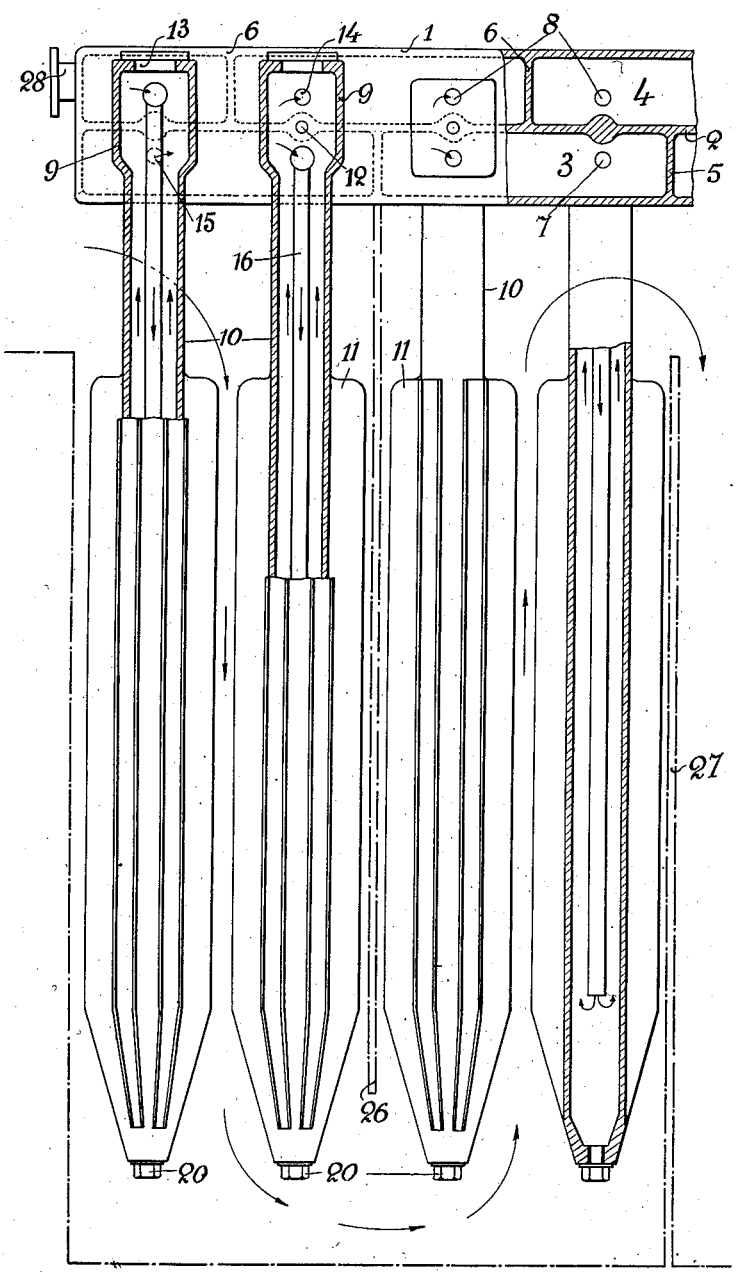

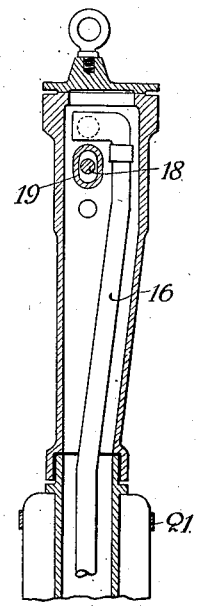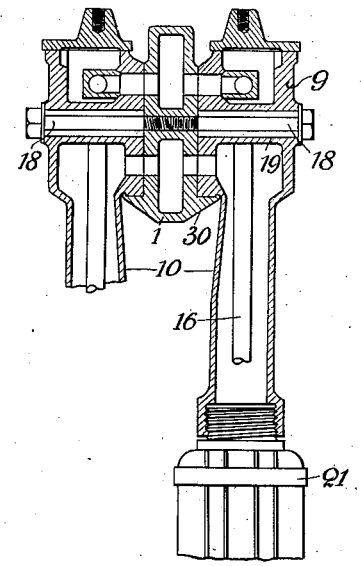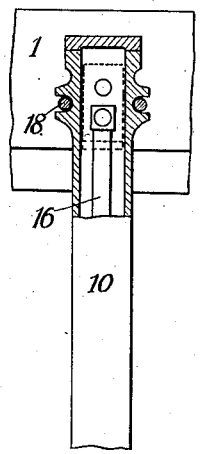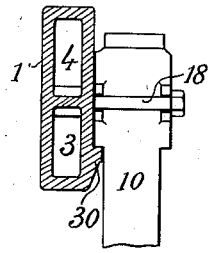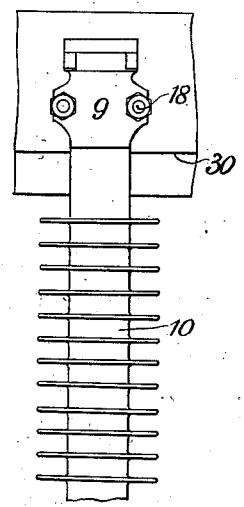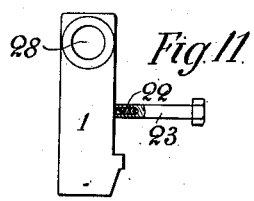

UNITED STATES PATENT OFFICE.

ALEXEI LOMSCHAKOW, OF ST. PETERSBURG, RUSSIA.

HEAT-EXCHANGE DEVICE.

1,048,186.  Specification of Letters Patent.  Patented Dec. 24, 1912.

Application filed December 26, 1911. Serial No. 667,912.

*To all whom it may concern:*

Be it known that I, ALEXEI LOMSCHAKOW, a subject of the Emperor of Russia, residing at 13 Nowosilzewskaja, Lesnoi, St. Petersburg, in the Empire of Russia, have invented certain new and useful Improvements in Heat-Exchange Devices, of which the following is a specification.

The invention relates to an apparatus for the exchange of temperature between gases on the one hand and liquids or vapor on the other hand, this apparatus being intended mainly for use as a feed water heater or steam superheater heated by the combustion gases for boiler installations and similar purposes; it is provided with tubes depending from the distributing members having therein superposed cavities divided into a plurality of chambers by relatively staggered partitions. The heat exchange device in accordance with the invention under all conditions renders possible and facilitates the provision of a heating surface exactly corresponding to prevailing requirements as regards conductivity and the like while and at the same time permitting of exchanging the several circulation elements without difficulty. The said tubes are headed into the lateral walls of the distributing members in such a manner that lateral perforations of the head register with corresponding perforations in the distributing member.

The accompanying drawing illustrates various embodiments of the invention as applied to preliminary feed water heaters and the like.

Figure 1:
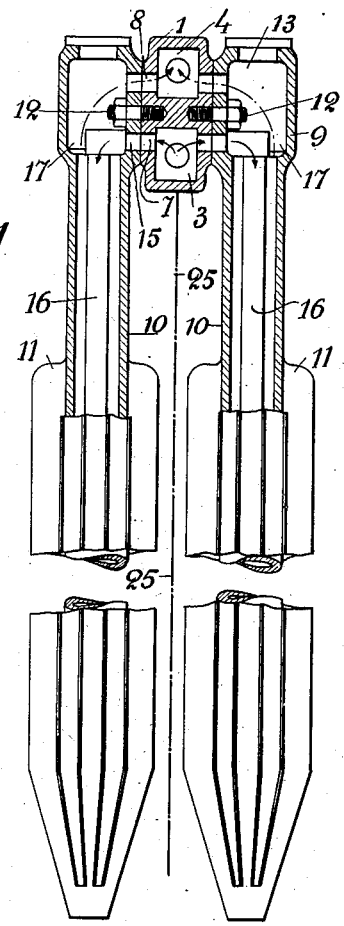
Figure 4:
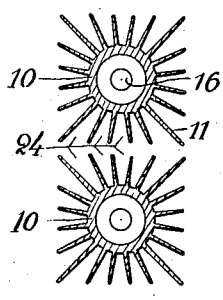
Figure 2:
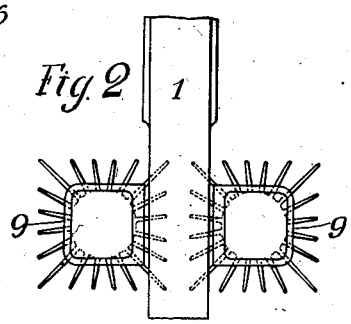
Figure 5:
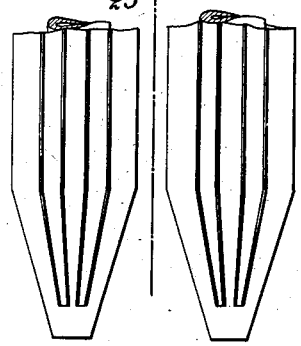

Figures 1 to 3 illustrate one embodiment in three views at right angles to each other partly in section. Figs. 4 and 5 are cross sections of the Field tubes with longitudinal ribs on the outer tube. Figs. 6 to 11 illustrate additional forms of the apparatus or constructional details thereof.

The supporting member for the tubes 10 forming the temperature exchanger surface of each preliminary heater element presents the form of a flat hollow body 1 (Figs. 1 to 3) arranged on edge with two cavities 3 and 4 separated by the horizontal longitudinal wall 2 which are divided into a plurality of chambers by means of relatively staggered partitions 5 and 6. Above and below the partition 2, openings 7 and 8 are situated in the side walls of the hollow body 1 in such a manner that in each chamber 3 and 4 two openings 7 and 8 are always situated immediately one above the other. The box-like head 9 of the tube 10 which in the construction illustrated comprises external longitudinal ribs 11 which do not extend to the head 9 or the supporting member 1 also comprises in its smooth side wall two openings 14 and 15 which when the tube 10 is screwed vertically onto the supporting member 1 by means of the nut 12 coincide with the openings 7 and 8 and thus establish communication between the tube 10 and the superposed chambers of the hollow body 1. By means of the opening 13 in the upper wall of the tube head 9 (which opening is adapted to be closed) a circulation tube 16 is inserted into the tube 10 and by means of a lateral socket located on its upper end is suspended in one of the corresponding passages 14 and 15. A wedge piece 17 or the like presses the tube 16 against the wall of the passage and holds it in the correct axial position in the tube 10. A water-tight joint between the tube head 9 and the distributing member 1 is insured by means of suitable washers or other known means.

The feed water to be preliminarily heated is introduced at one end of the distributing member at 28 (Fig. 3) for example in its first upper chamber; this water passes through both side walls by means of the passages 8, 14 into the inner tubes 16 of the two corresponding tubes 16, 10 through which it flows downward, ascends in the annular space and passes through the corresponding two passages 15, 7 into the first lower chamber of the distributing member. From the latter chamber the water passes through two other passages 7, 15, into the inner tube 16 of the next following pair of similarly arranged tubes 10, 16 from which it passes into the second upper chamber and so forth until it reaches the discharge end of the member 1. During this long passage the water is gradually heated more and more by the combustion gases which flow over the exterior of the tubes 10. The apparatus is built into the smoke flue of the installation in such a manner that the hot gases flow over the ribbed parts of the tubes 10 in the longitudinal direction; they can be introduced into the channel-like intervals 24 formed by the ribs 11 (Fig. 4) either from above or from below. If the heat of the gases is to be utilized to the maximum extent its path can be prolonged by the provision of guide walls 26 and 27 (Fig. 3)

in any desired manner and the water and gas can be caused to travel in counter current. As shown in Fig. 1 at 25 the guide walls for the gases can also run in the direction of the length of the distributing member.

The inner circulation tube 16 can either be fitted alternately to the upper and lower openings 7 and 8 of the distributing member 1 as shown in Fig. 3 or they may all open into its lower chambers or all into its upper chambers so that the water either descends in these tubes and ascends in the annular passages and vice versa. If no actual liquid circulates in the apparatus but a gas or vapor (for steam superheating for example) the tubes 10 are preferably formed with inner ribs 29 also (Fig. 5).

By suitably distributing the lateral openings 7 and 8 of the body 1 and openings 14 and 15 in the head 9 of the tubes 10 these tubes can if desired be inclined at an acute angle to the longitudinal axis of the distributing member 1, and a portion of the Field tubes of one preliminary heater element can be inclined in one direction and the others in the opposite direction.

The smooth and ribbed portions of the tubes 10 can be formed separately and united in the known manner by connecting sockets (Figs. 6 and 7). The ribbed elements can be protected from shocks by fitting bands 21 of iron or the like over them. The construction shown in Figs. 6 and 7 differs from the constructions previously described also owing to the fact that the head 9 of the tubes 10 is traversed by an annular web 19 and is pressed against the side wall of the distributing member by a long tightening bolt 18 from the exterior. The weight of the circulation element is preferably taken by projections 30 on the member 1 (Fig. 7). In order to render the inner annular webs 19 unnecessary the tightening of the head 9 can be effected by means of two outer bolts 18 (Figs. 8 to 10) or by means of threaded bolts 22 and recessed bolts 23 (Fig. 11). In Fig. 8 for example a circulation element with smooth outer tube 10 is shown while in Fig. 9 an outer tube with annular ribs is employed. Fig. 10 shows that the circulation elements can be arranged on one side of the distributing member 1 only, in which case of course the openings 7 and 8 in the other lateral wall must be closed if such have been provided. The openings 7 and 8 must also be closed when any circulation element 10, 16 is to be rendered inoperative and removed. If the spaces 3 and 4 are divided into chambers in order to conduct the water through the circulation elements in succession as explained with reference to Figs. 1 to 3, the passages 7 and 8 of the element removed must be connected by a tube bend.

The openings on the lower ends of the tubes 10 (Fig. 3) closed by small screws 20 serve for the reception of dirt, boiler scale and so forth.

The advantages secured by the novel apparatus reside broadly in the fact that the conductivity and form or space required can readily be adapted to the prevailing conditions and requirements either by modifying the number of the distributing members 1 with the circulation elements 10, 16 and also the number of these on each distributing member or by cutting out such elements or by employing shorter distributing chambers.

What I claim and desire to secure by Letters Patent of the United States is:—

1. A temperature exchange device comprising a hollow distributing member having chambers therein, a system of outer and inner tubes, headers on said outer tubes, ports in said headers communicating with the outer and inner tubes and with corresponding ports in the lateral walls of said distributing member, and releasable means for retaining said headers in close contact with said distributing member.

2. A temperature exchange device comprising a hollow distributing member, upper and lower chambers in said distributing member, a system of inner and outer tubes headers on said outer tubes, ports in said headers communicating with the outer and inner tubes and alternately with the upper and lower chambers in said distributer through ports in the lateral walls thereof, and releasable means for holding said headers in close contact with the lateral walls of said distributer.

3. A temperature exchange device a hollow distributing member divided into superposed compartments subdivided into a plurality of chambers, a system of outer and inner tubes, headers on said outer tubes, ports in the lateral walls of said headers communicating with the outer and inner tubes and with the chambers in said distributing member through ports in the lateral walls thereof, and means extending completely through said distributer and headers for holding the latter in close contact with the distributing member.

4. A temperature exchange device comprising the combination with a hollow distributing member divided into two compartments said compartments being subdivided into a plurality of chambers by means of relatively staggered partitions, of outer tubes having part of the length thereof ribbed and having box-like heads said heads being bolted to the lateral walls of said distributer by means of internal bolts and having ports therein communicating with ports in the lateral walls of the distributing member and smooth inner tubes communicating with one of the ports in said head.

5. A temperature exchange device comprising the combination with a hollow distributing member divided into two superposed compartments sub-divided into a plurality of chambers by means of relatively staggered partitions of outer tubes formed in two parts an upper smooth part and a lower ribbed part and having box-like heads said heads being held closely against the lateral walls of said distributing member by through bolts passing through an annular web in said heads and distributing member and communicating with the chambers in the latter by means of ports therein and in said heads inner smooth tubes being also provided each of which communicates with one of the ports in said head.

In testimony whereof I affix my signature in presence of two witnesses.

ALEXEI LOMSCHAKOW.

Witnesses:
H. A. LOVIAGUINE,
WILHELM HEININGER.